(12) United States Patent
Friedrichs et al.

(10) Patent No.: US 7,440,851 B2
(45) Date of Patent: Oct. 21, 2008

(54) METHOD FOR PROVIDING NAVIGATION INSTRUCTIONS

(75) Inventors: Arne Friedrichs, Braunschweig (DE); Gerd Draeger, Braunschweig (DE); Volker Skwarek, Bad Salzdetfurth (DE)

(73) Assignee: Robert Bosch GmbH, Stuttgart (DE)

( * ) Notice: Subject to any disclaimer, the term of this patent is extended or adjusted under 35 U.S.C. 154(b) by 653 days.

(21) Appl. No.: 10/494,149

(22) PCT Filed: Aug. 22, 2002

(86) PCT No.: PCT/DE02/03069

§ 371 (c)(1),
(2), (4) Date: Sep. 28, 2004

(87) PCT Pub. No.: WO03/040655

PCT Pub. Date: May 15, 2003

(65) Prior Publication Data

US 2005/0049780 A1 Mar. 3, 2005

(30) Foreign Application Priority Data

Oct. 30, 2001 (DE) .................... 101 53 528

(51) Int. Cl.
*G01C 21/36* (2006.01)
(52) U.S. Cl. .................... 701/211; 701/300; 340/995.27
(58) Field of Classification Search .................... None
See application file for complete search history.

(56) References Cited

U.S. PATENT DOCUMENTS

| | | | | |
|---|---|---|---|---|
| 4,403,291 A | * | 9/1983 | Von Tomkewitsch | ......... 701/25 |
| 5,270,936 A | * | 12/1993 | Fukushima et al. | ......... 701/213 |
| 5,323,321 A | * | 6/1994 | Smith, Jr. | ......... 701/211 |
| 6,067,502 A | | 5/2000 | Hayashida et al. | |
| 6,070,124 A | * | 5/2000 | Nimura et al. | ......... 701/211 |
| 6,385,538 B1 | * | 5/2002 | Yokota | ......... 701/211 |
| 6,430,498 B1 | * | 8/2002 | Maruyama et al. | ......... 701/200 |
| 6,487,496 B2 | * | 11/2002 | Katayama et al. | ......... 701/209 |
| 6,611,753 B1 | * | 8/2003 | Millington | ......... 701/209 |
| 6,751,551 B2 | * | 6/2004 | Katayama et al. | ......... 701/211 |
| 6,762,696 B2 | * | 7/2004 | Hulverscheidt et al. | .. 340/995.2 |
| 7,260,473 B2 | * | 8/2007 | Abe et al. | ......... 701/200 |
| 2002/0004704 A1 | * | 1/2002 | Nagatsuma et al. | ......... 701/213 |
| 2003/0054830 A1 | * | 3/2003 | Williams et al. | ......... 455/456 |

FOREIGN PATENT DOCUMENTS

| | | | |
|---|---|---|---|
| DE | 4412859 | * | 11/1994 |
| JP | 5303334 | | 11/1993 |
| JP | 6288779 | | 10/1994 |
| JP | 07027844 | | 1/1995 |
| JP | 08122087 | | 5/1996 |
| JP | 8304101 | | 11/1996 |
| JP | 9090868 | | 4/1997 |
| JP | 2000-241175 | * | 9/2000 |
| JP | 2001159536 | | 6/2001 |
| JP | 2002-213987 | * | 7/2002 |

\* cited by examiner

*Primary Examiner*—Michael J. Zanelli
(74) *Attorney, Agent, or Firm*—Kenyon & Kenyon LLP

(57) ABSTRACT

A method for making destination guidance instructions available to a user, wherein at least two direction indications, from a current position to waypoints and to a destination, respectively, are prepared and are outputted for the user. At least one distance indication is also prepared. Output of these indications may be accomplished simultaneously on a display. Output of these indications may be used in a region where no known map data or route data are available to the user.

15 Claims, 4 Drawing Sheets

METHOD FOR PROVIDING NAVIGATION INSTRUCTIONS

FIELD OF THE INVENTION

The invention relates to a method for making destination guidance instructions available to a user who possesses no map data or route data.

BACKGROUND INFORMATION

Navigation devices that guide vehicles and their users on a previously calculated route are known. Navigation devices that have access to data material outside the route being traveled are capable of guiding the user to the destination on an alternative route, which may need to be recalculated. If the user is located outside the digitized road system, however, the user is then usually requested to turn around immediately, or the direction and distance to a known route point are indicated in the form of a compass rose.

What the compass rose usually suggests is the shortest distance (beeline) to a known path segment on the map or route. The compass rose is understood as a (compass) direction with respect to North, or as a travel direction (direction of the vehicle relative to the path segment).

SUMMARY OF THE INVENTION

The present invention relates to an easy and clear orientation of the user, for example, for a geographic region about which the user possesses no known map data or route data. With one glance at the display, the user is given answers to the questions:

What is the direction and distance to my destination?

What is the direction and distance to a closest waypoint that will guide me to the destination?

With the combined output/display of several direction and distance indications, the user may select the route most favorable for him as a function of his surroundings, e.g. one-way streets that cannot be traveled, a river with no nearby bridge, etc.

The output according to the invention combines the direction and distance data to the various waypoints compactly and clearly in one display. It may be advantageous, as a result, that the driver may very quickly infer the desired information. Furthermore, the driver has not just one direction indication recommended to him but at least two simultaneously, so that he can select one of them. The driver will select the one that is, in his opinion, more favorable for arriving more quickly at the destination. This is always the case when, for example, a direction indication encounters, for example, a river or a one-way street in the wrong direction.

Advantageously, the directional arrow may be depicted in the foreground or the driver's visual focus, which also contains the shorter and/or more favorable distance to the destination or waypoint. The driver may thus be presented with the navigation unit's decision without having to dispense with the second indication.

Advantageously, the destination or waypoint name (and possibly street name) may also be integrated into the display, so that the user may also orient himself and make a decision on the basis of the destination name.

Advantageously, the direction indications may be switched back and forth manually, so that the driver decides which indication is currently the more important for him.

Advantageously, the direction indications may be switched back and forth automatically, so that the shortest or geometrically most favorable one for the driver/user is always in the foreground.

Advantageously, the vehicle's direction with respect to North may also be integrated into the display, signifying a further orientation aid for the driver.

Advantageously, in addition to the direction and distance data, the geometry (known to the navigation unit) of the map or route, or even a previously recorded track in the case of off-road navigation, may be displayed in the background for better driver orientation. The driver as a result receives not only indications to two waypoints, but all the local navigation knowledge at one glance.

Advantageously, a direction and/or distance indication may also be outputted/spoken acoustically and the voice outputs may be linked to the optical direction indication that is in the foreground.

DETAILED DESCRIPTION

Figure 1:
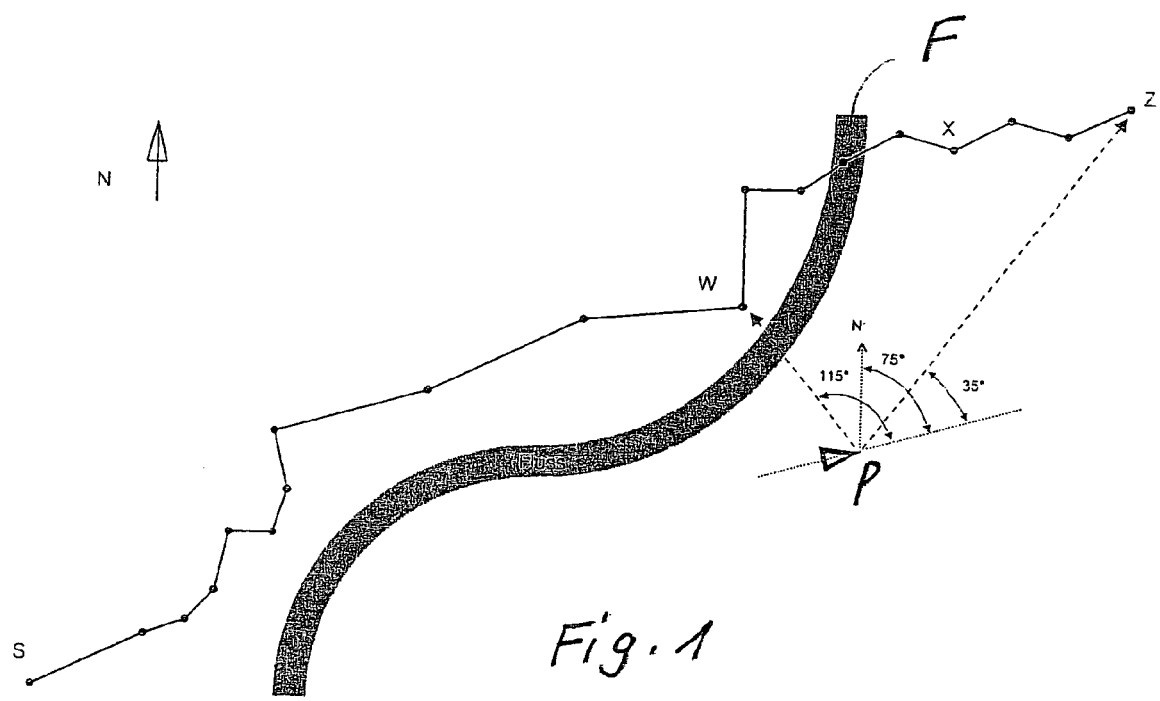
FIG. 1 shows a topology of a routing in which the destination is located farther away than a waypoint of the route.
Figure 2:
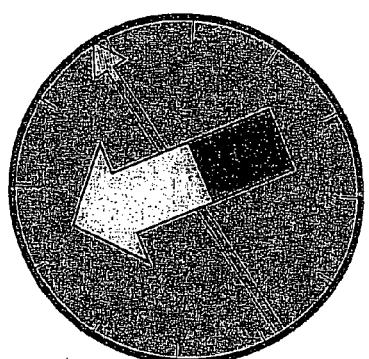
FIG. 2 shows a combined direction and distance display having two directional arrows.

FIG. 1 shows the topology of a routing from a starting point S to a destination Z. The routing is known to the user, i.e. it was prepared by his navigation unit on the basis of internal map and/or route data (map or route CDs) or, for example, ascertained from information sent to the navigation unit via mobile radio from a control center for map data or route data. The driver/user has strayed from this proposed routing of his navigation unit and is now located at current position P, in a region about which no known map data or route data are available to him, i.e. in a so-called non-digitized off-road region. From this position P, a nearby destination-guidance waypoint W of the known routing, located at a geometric distance of 600 m, cannot be arrived at because it lies, when viewed from position P, on the other side of a river F. According to the present invention the user receives, for this topology, two direction indications and at least one distance indication, specifically one direction indication proceeding from present position P to waypoint W in his vicinity about which he possesses map data or route data, and a further direction indication to destination Z or to a further destination-guidance waypoint X that is closer to destination Z than waypoint W in the user's vicinity. The prepared direction indications are prepared for, in particular, simultaneous output to the user, and at least one distance indication pertaining to a direction indication is prepared and is provided, in particular together with the two direction indications, for output to the user. Output is preferably accomplished graphically on a display, as depicted e.g. in FIG. 2. The arrow present in the foreground shows the direction indication and the distance to the closest waypoint W of the known routing. The distance is evident from a distance bar inside this directional arrow. The smaller the distance bar becomes, the closer the waypoint W. The directional arrow presented in the background on the display shows, in similar fashion, the direction and distance to destination Z. To push the directional arrow shown in the foreground into the visual field, it is depicted as being wider than the directional arrow to destination Z. Alternatively or additionally, the direction and/or distance indication is outputted acoustically, for example in the form "Next waypoint is 600 m at 7 o'clock, destination is 5 km at 10 o'clock."

Figure 6:
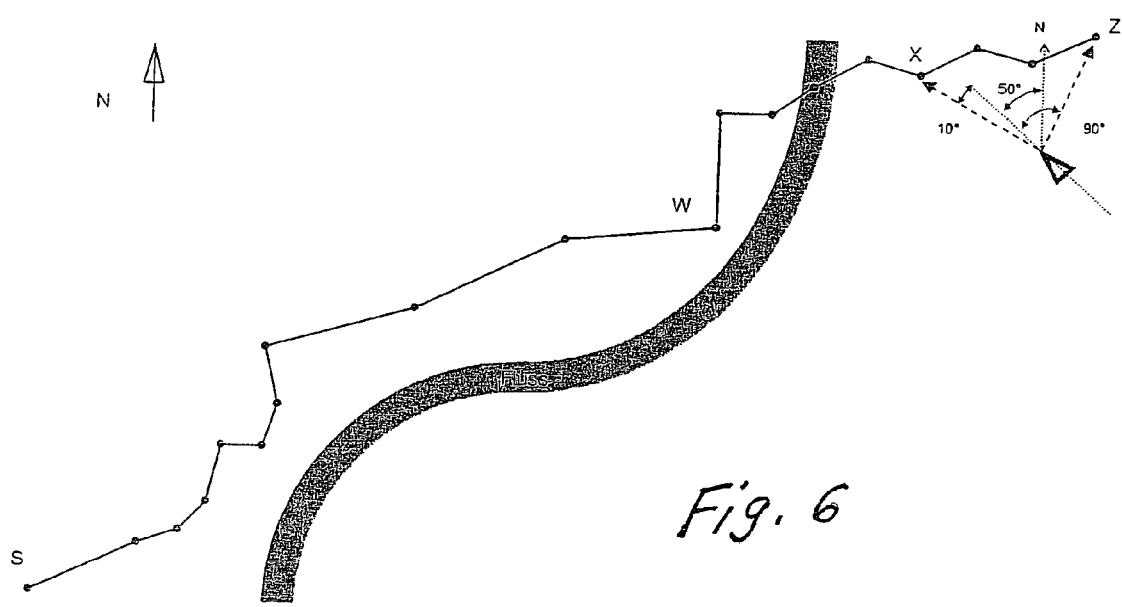
FIG. 6 shows a topology of a routing in which the destination is located closer than a waypoint of the route.
Figure 7:
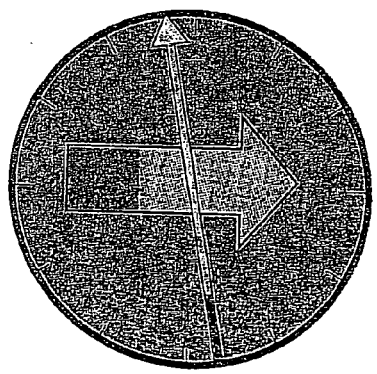
FIG. 7 shows a combined direction and distance display for the topology according to FIG. 6.

In the exemplified embodiment according to FIG. 1, waypoint W cannot be arrived at directly. In this case the driver/user follows the thin directional arrow in the background to destination Z. The driver has followed the directional arrow, and a new situation has arisen as depicted in FIG. 6. The driver/user receives in this context the direction displays with integrated distance display depicted in FIG. 7. Since a new waypoint to be traveled to has been determined by the navigation system, the following voice output may be simultaneously activated: "Destination is 500 m at 3 o'clock, closest waypoint is 600 m at 12 o'clock." This time the driver/user follows the direction toward waypoint X (intermediate destination), since he cannot find a road that leads even approximately toward destination Z. Once he has reached waypoint X he is no longer in the off-road region and can be guided by his navigation unit, in the usual fashion, on the known route to destination Z.

Figure 3:
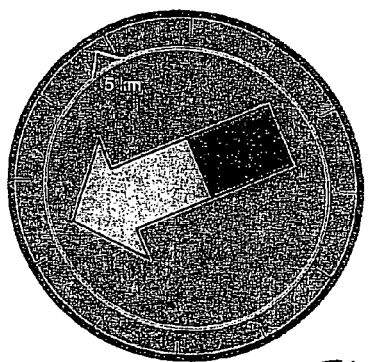
FIG. 3 shows an alternative combined direction and distance display having two directional arrows.
Figure 8:
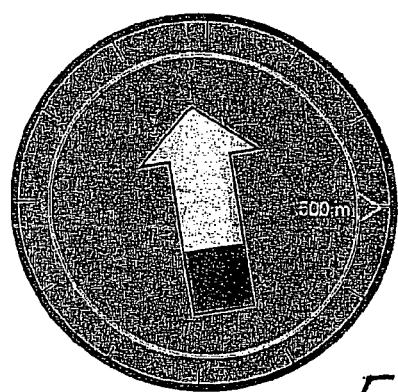
FIG. 8 shows an alternative combined direction and distance display for the topology according to FIG. 6.

FIG. 3 and FIG. 8 depict two direction displays in which the arrow in the foreground again shows, in the same fashion, the direction and distance to the closest waypoint on the known route. The distance is once again apparent from a distance bar in the arrow. The arrowhead in the outer circle shows the direction to the destination, the distance being displayed as text. In a development, the distance to the closest waypoint can also be presented as text.

Figure 4:
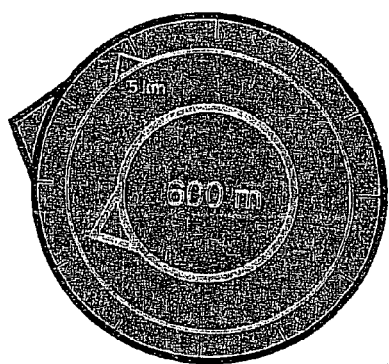
FIG. 4 shows another alternative combined direction and distance display having two directional arrows.
Figure 9:
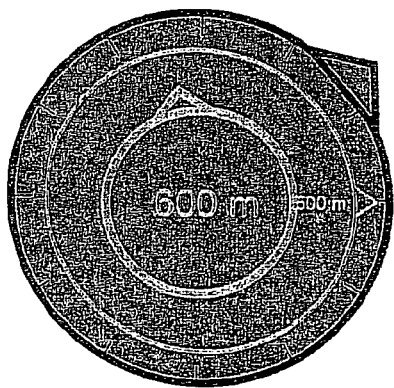
FIG. 9 shows another alternative combined direction and distance display for the topology according to FIG. 6.

FIG. 4 and FIG. 9 in turn depict the indications of direction and distance to the waypoint and destination as circles with arrowheads. The information may be perceived more quickly because it is larger and is arranged centrally. Compass North is additionally depicted on the outer edge by way of an arrowhead.

Figure 5:
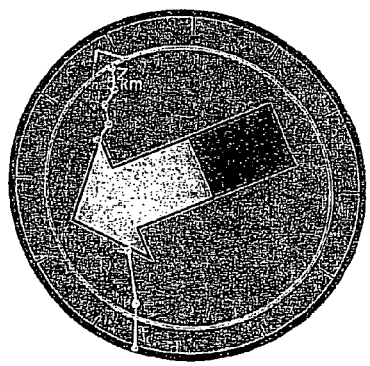
FIG. 5 shows a combined direction and distance display having a route depiction in the background.
Figure 10:
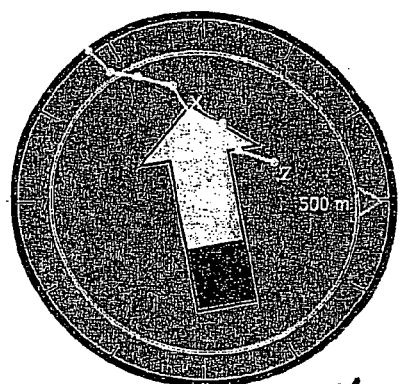
FIG. 10 shows the direction and distance display depicted in FIG. 8, with the route depiction additionally superimposed.

FIG. 5 and FIG. 10 show the same information as in FIG. 3 and FIG. 8, but may additionally depict the route or map that the user possesses or, possibly, a recorded track in the case of off-road operation. The various depiction possibilities may also be combined with one another.

In addition to optical indication, an acoustic indication may also be provided, as mentioned. The message may announce one or more direction and/or distance indications. The point in time of a new message may be determined by the occurrence of one or more of the following criteria:

after expiration of a defined static or dynamic time interval, e.g. a short interval at high speed, a long interval at low speed;

in the event of a change in the waypoint to be intercepted, to which the indication refers;

after a defined unit of distance has been traveled;

after a defined change in direction with respect to the last direction message has been exceeded;

after the distance to the next waypoint has fallen below a defined value.

Possible messages can be spoken in the following forms:
"Closest waypoint is 600 m at 7 o'clock."
"Destination is 5 km at 10 o'clock."
"Closest waypoint is 600 m to the left behind the vehicle."

Together with the direction and distance indications, additional descriptive attributes—for example the destination or waypoint name (street name)—on the basis of which the user can quickly become oriented and make decisions, may be presented on the display. The direction indications may be individually adjustable by the user, for example, switchable back and forth, in terms of foreground and background display. The user may thus decide for himself which indication is currently more important to him, for example, as a function of his surroundings, e.g. one-way streets that cannot be traveled, a river with no nearby bridge, etc.

The direction indication in the off-road region may be provided to the user, for example, via his GPS device. The distance from the current position P to known waypoints W, X, Z may be ascertained easily by way of the normal of the difference vector.

What is claimed is:

1. A method for making destination guidance instructions available to a user, comprising:

preparing at least one first direction indication proceeding from a current position of the user to a first destination-guidance waypoint that is close to the user and about which the user possesses map data or route data;

preparing at least one second direction indication from the current position to a destination or to a second destination-guidance waypoint that is closer to the destination than the first destination-guidance waypoint;

outputting the prepared direction indications simultaneously; and preparing, for the prepared at least two direction indications, at least one distance indication, corresponding to one of the at least two direction indications; and outputting to the user the at least one distance indication, together with the at least two direction indications;

wherein one of the first direction indication and the second direction indication is depicted in a foreground on a display, and wherein a shortest of the at least two direction indications is always presented to the user in the foreground on the display.

2. The method according to claim 1, wherein the at least one distance indication is depicted as a directional arrow on a display.

3. The method according to claim 1, wherein the at least one distance indication is depicted as a distance bar inside the at least one distance indication.

4. The method according to claim 1, wherein the at least two direction indications are outputted on a display together with descriptive attributes.

5. The method according to claim 4, wherein the descriptive attributes include at least one of a waypoint name and a street name.

6. The method according to claim 1, wherein a predefined reference direction is outputted on a display in addition to the at least two direction indications.

7. The method according to claim 1, wherein the predefined reference direction is compass North.

8. The method according to claim 1, wherein an at least one direction indication and the at least one distance indication are outputted acoustically.

9. The method according to claim 1, wherein one of the first direction indication and the distance indication depicted in the foreground on the display are outputted acoustically.

10. The method according to claim 1, wherein the at least one distance indication is outputted in text form.

11. The method according to claim 1, wherein in addition to the at least one direction indication and the at least one distance indication, the geometry of a map or route known to the user's own navigation device is depicted in a background of a display.

12. The method according to claim 1, wherein in addition to the at least one direction indication and the at least one distance indication, a track recorded in an off-road region is depicted in a background of a display.

13. A method for making destination guidance instructions available to a user, comprising:
   preparing at least one first direction indication proceeding from a current position of the user to a first destination-guidance waypoint that is close to the user and about which the user possesses map data or route data;
   preparing at least one second direction indication from the current position to a destination or to a second destination-guidance waypoint that is closer to the destination than the first destination-guidance waypoint;
   outputting the prepared direction indications simultaneously; and
   preparing, for the prepared at least two direction indications, at least one distance indication, corresponding to one of the at least two direction indications; and
   outputting to the user the at least one distance indication, together with the at least two direction indications;
   wherein one of the first direction indication and the second direction indication is depicted in a foreground on a display, and
   wherein the most favorable for the user of the at least two direction indications is always presented to the user in the foreground on the display.

14. A method for making destination guidance instructions available to a user, comprising:
   preparing at least one first direction indication proceeding from a current position of the user to a first destination-guidance waypoint that is close to the user and about which the user possesses map data or route data;
   preparing at least one second direction indication from the current position to a destination or to a second destination-guidance waypoint that is closer to the destination than the first destination-guidance waypoint;
   outputting the prepared direction indications simultaneously; and
   preparing, for the prepared at least two direction indications, at least one distance indication, corresponding to one of the at least two direction indications; and
   outputting to the user the at least one distance indication, together with the at least two direction indications;
   wherein one of the first direction indication and the second direction indication is depicted in a foreground on a display, and
   wherein the presentation of the at least two direction indications is individually adjustable by the user.

15. The method according to claim 14, wherein the at least two direction indications depicted in the foreground on the display is the one currently more important by the user.

\* \* \* \* \*